United States Patent Office 3,325,488
Patented June 13, 1967

3,325,488
DIPHENOXYACETIC ACID AMIDE
DERIVATIVES
Victor Lafon, Paris, France, assignor to Societe Anonyme
dite: Orsymonde, Paris, France, a French company
No Drawing. Filed Nov. 13, 1963, Ser. No. 323,239
Claims priority, application Great Britain, Nov. 16, 1962,
43,491/62; Jan. 25, 1963, 3,275/63
23 Claims. (Cl. 260—247.2)

The present invention relates to compounds of the following formula:

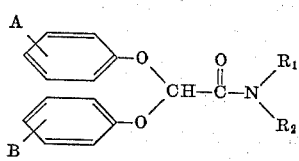

in which $R_1$ and $R_2$ represent, together or separately, a hydrogen atom, an alkyl radical, an alkyl-heterocyclic radical, a hydroxylalkyl radical, an aryl radical or a heterocyclic radical with the N atom to which they are attached, which heterocyclic radical may have aryl or alkyl substituents, and in which A and B each represent a hydrogen atom or a substituent which is preferably a halogen atom and, most preferably, a chlorine atom.

The invention is directed principally to the compounds defined above, which are novel and which particularly have chlorine substituents on the phenyl groups.

The invention also relates to the applications of the compounds defined above, principally in the therapeutic field, and to compositions containing the compounds in association with pharmaceutically-acceptable non-toxic carriers.

The present invention also relates to a process of preparation of the compounds defined above.

According to a first embodiment of the process, diphenoxy-acetyl chloride is reacted in equimolar proportions with a primary tertiary diamine or with a bimolar quantity of a primary amine.

The diphenoxyacetyl chloride is preferably put into solution in a solvent such as chloroform or ethyl acetate. The reaction is usually carried out in the cold. An excess of amine can advantageously be used.

According to a second embodiment, an excess of an amine is reacted with a lower alkyl (preferably ethyl) diphenoxyacetate in solution in ethanol.

This embodiment of the process can take place in the cold or with reflux heating.

Illustrative examples are given below of the process of preparation of the compounds of the invention.

Diphenoxyacetyl chloride is preferably previously prepared in the following manner:

30 g. of thionyl chloride was introduced into a 100 cc. three-neck flask, fitted with an upright condenser, a central agitator and a bromine ampoule. 15.6 g. of diphenoxyacetic acid were added in small portions and the mixture was heated under reflux for 3 hours. The excess thionyl chloride was distilled off and the residue was dissolved in chloroform.

This solution was then used to prepare compounds of the invention according to the first embodiment set out above.

EXAMPLE 1

1-(diphenoxy-acetyl)-4-(4'-chloro-phenyl)-piperazine

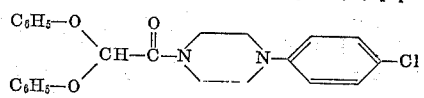

A chloroform solution containing 9.5 g. of 1-(4'-chlorophenyl)-piperazine was added dropwise and with agitation to the afore-mentioned solution of diphenoxyacetyl chloride, cooled in an ice-salt mixture. At the end of the addition, agitation was continued for one hour and the temperature was allowed to return to 20° C. The precipitate formed was dried, dissolved in the minimum distilled water and the solution was treated with saturated $Na_2CO_3$ solution. The amide liberated was recovered on a filter, dried, washed with cold water and recrystallised from ethyl acetate. The yield of pure product, containing 1 mole of water of crystallisation, was 40%.

This product has the form of white needles, which are insoluble in water and soluble in tetrahydrofuran and hot alcohol. Its melting point, determined by the Köpfler block method, like all those given below, is 128° C.

EXAMPLE 2

7.3 g. (0.1 mole) of diethylamine, in solution in chloroform, was added dropwise to the foregoing solution of diphenoxyacetyl chloride, obtained from 0.05 mole of the acid cooled to 0° C.

The temperature was allowed to return to 18° C. and then the precipitate formed was dried. It was washed in water to eliminate diethylamine hydrochloride and then recrystallised from butanone.

The yield of pure product was 75%, calculated on the diphenoxyacetic acid.

The melting point of the product is 104° C.

Its analysis gives—calculated: C%=68.13, H%=7.25, N%=4.42. Found: C%=68.09, H%=7.23, N%=4.63.

Analytical studies have shown that it is not diphenoxydiethylacetamide hydrated with one molecule of water, but a salt of the formula:

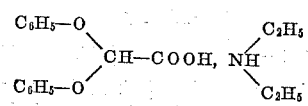

To carry out the second embodiment of the process, ethyldiphenoxyacetate was first prepared by proceeding in the following manner:

12.2 g. of diphenoxyacetic acid, 2.3 g. of ethanol and 5.2 g. of dimethoxypropane were successively introduced into a 50 cc. flask provided with a reflux condenser. The mixture was heated to boiling for 4 hours. After cooling, it was diluted with ethyl alcohol neutralised by agitation with $CaCO_3$.

After filtration, the alcoholic solution was used, without isolating the ester, for the preparation of compounds of the invention.

EXAMPLE 3

(Diphenoxy)-acetylamidopropyl-morpholine

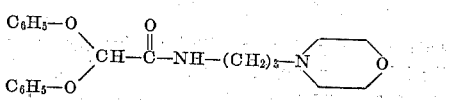

15 g. of aminopropyl-morpholine was slowly added to the foregoing solution. The reaction mixture was left for 12 hours at the ordinary temperature and left for 48 hours in a refrigerator at −12° C. The crystals formed were dried and recrystallised from a mixture of 60 parts of methanol and 40 parts of water. The yield of the pure product was 58% of the theoretical, calculated on the diphenoxyacetic acid.

This product has the form of white crystals, slightly soluble in water and in petroleum ether, soluble in alcohol, chloroform and acetone and less soluble in ether and in benzene.

Its melting point is 62° C.

EXAMPLE 4

(Diphenoxy)-acetamide

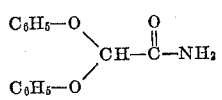

This compound was obtained by the procedure described in Example 3, in an 80% yield, by using a 60% aqueous ethanol solution as the recrystallisation solvent. Its melting point is 109° C.

EXAMPLE 5

(Diphenoxy)-methylacetamide

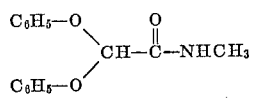

This compound was obtained by the procedure described in Example 3, in a 55% yield, by using a 60% aqueous ethanol solution as the recrystallisation solvent. Its melting point is 108° C.

EXAMPLE 6

(Diphenoxy)-dimethylacetamide

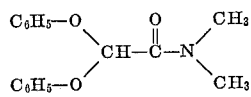

This compound was obtained by the procedure described in Example 3, in a 40% yield, by using a 50% aqueous methanol solution as the recrystallisation solvent. Its melting point is 86° C.

EXAMPLE 7

(Diphenoxy)-N,N'-di-(beta-hydroxyethyl)-acetamide

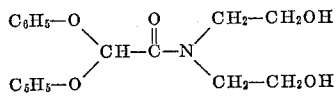

21 g. of diethanolamine (0.2 mole) was added to an alcoholic solution containing the ester derived from 17.2 g. of the acid (0.1 mole) and the mixture was heated to boiling under reflux for 2 hours. After cooling, the crystals were dried and purified by recrystallisation from a 30% aqueous methanol solution.

The yield of pure product was 50%. This product has the form of white crystals, and is insoluble in water and cold alcohol and soluble in these solvents in the hot. Its melting point is 79°–80° C.

EXAMPLE 8

(Diphenoxy)-acetylamido-ethylmorpholine

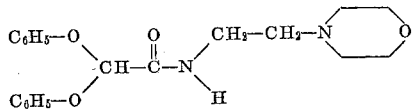

This compound was obtained by the procedure described in Example 7, in a 50% yield, by using a 50% aqueous acetone solution as the recrystallisation solvent. Its melting point is 74° C.

EXAMPLE 9

(Diphenoxy)-N-(beta-hydroxyethyl)-acetamide

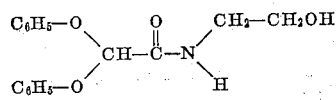

This compound was obtained by the procedure described in Example 7, in a 77% yield, by using a 30% aqueous ethanol solution as the recrystallisation solvent. Its melting point is 64°–65° C.

EXAMPLE 10

Bis-(diphenoxy)-acetylpiperazine

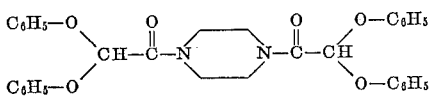

This compound was obtained by the procedure described in Example 7, in a 51% yield, by using isobutanol as the recrystallisation solvent. Its melting point is 155°–156° C.

This product does not exactly fit the general formula given above, but it can be considered as the dimer of a compound where $R_1=R_2=CH_3$.

EXAMPLE 11

(Diphenoxy)-N-phenyl-acetamide

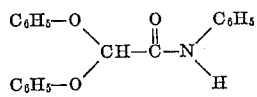

24.4 g. of diphenoxyacetic acid were heated under reflux for 2 hours with 56 g. of aniline (0.6 mole).

The reaction mixture was cooled and washed with 10% hydrochloric acid and then with distilled water. The insoluble material was taken up in chloroform which, on evaporation, gave a pasty mass. This was dissolved in ethanol and reprecipitated with excess water.

The crystals formed were dried and purified by recrystallisation from 50% ethanol.

24 g. of product were obtained, namely a yield of 75%. The product has the form of white crystals and is slightly soluble in water and soluble in ethanol, methanol chloroform and hot benzene. Its melting point is 111° C.

Analysis of the product gives—calculated: C%=75.20, H%=5.36, N%=4.38. Found: C%=75.21, H%=5.46, N%=4.58.

The following examples relate to chlorine-containing derivatives. For their preparation, the acid chlorides were first synthesised using the first embodiment of the process of the invention.

The acid chloride of bis-(chloro-4-phenoxy)-acetic acid was prepared in the following manner:

8 g. of bis-(4-chlorophenoxy)-acetic acid was slowly added in successive portions to 25 ccs. of thionyl chloride contained in a 50 cc. flask.

The flask was provided with a reflux condenser having a calcium chloride trap and the mixture was heated to boiling for 3 hours.

The excess thionyl chloride was eliminated by distillation at normal pressure and the residue was dissolved in a suitable organic solvent.

This solution can be used directly for the following preparations:

EXAMPLE 12

Bis-(4-chlorophenoxy)-N-methylacetamide

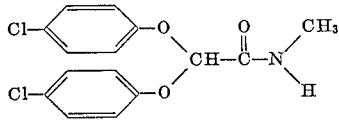

The acid chloride obtained from 15.6 g. of bis-(4-chlorophenoxy)-acetic acid was dissolved in benzene and maintained at 0° C.; a solution of 3.4 g. of monomethylamine in 5 ccs. of benzene was added dropwise while agitating mechanically.

The agitation was maintained for 1 hour after the end of the reaction and then the freezing mixture was removed and the temperature allowed to return to 20° C.

The benzene was evaporated off under vacuum and the residue was washed with cold water and recrystallised from 50% methoxyethanol.

The compound was obtained in a yield of 55%.

The product has the form of white needles, and is insoluble in water, chloroform and petroleum ether, soluble in ether, slightly soluble in the cold in alcohol and acetone, but is soluble in the latter in the hot.

Its melting point is 126° C.

EXAMPLE 13

*Bis-(4-chlorophenoxy)-acetamide*

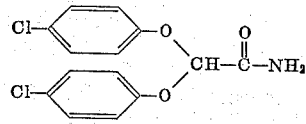

This compound was obtained by the procedure described in Example 12, in a 60% yield, using 40% ethanol as the recrystallisation solvent. The product has the form of a white crystalline powder, insoluble in water, soluble in ether and alcohol and very soluble in chloroform and acetone. Its melting point is 100° C.

EXAMPLE 14

*Bis-(4-chlorophenoxy)-N,N-dimethylacetamide*

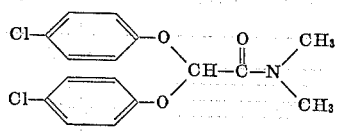

This compound was obtained by the procedure described in Example 12, in a 57% yield, by using a 55% aqueous methanol solution as the recrystallisation solvent. The product has the form of white acicular crystals, insoluble in water, soluble in ethanol, acetone and chloroform and slightly soluble in petroleum ether.

Its melting point is 89° C.

The second embodiment of the process of the invention has also been used for the chlorine-containing derivatives; ethyl bis-(4-chlorophenoxy)-acetate was first prepared in the following manner:

3.45 g. of ethanol and 5.7 g. of 2,2-dimethoxy-propane were successively introduced into a 50 cc. flask provided with a reflux condenser and containing 15.6 g. (0.05 mole) of bis-(4-chlorophenoxy)-acetic acid.

After maintaining the mixture at boiling on a water-bath for 4 hours, the excess alcohol was eliminated by evaporation under vacuum and the residue was taken up in chloroform.

The chloroform solution was washed with a dilute solution of sodium carbonate and then with distilled water.

After drying overnight over anhydrous sodium sulphate, the chloroform was evaporated and the residue, comprising a yellow oily liquid, was used without further purification for amidation reactions.

EXAMPLE 15

*Bis-(4-chlorophenoxy)-acetylamido-N-propylmorpholine*

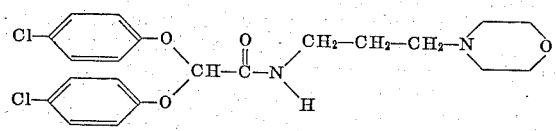

3 g. of ethyl bis-(4-chlorophenoxy)-acetate were heated for 2 hours under reflux with 2 g. of amino-propylmorpholine.

After two to three days at −5° C., the mixture was taken up in 10% hydrochloric acid. Bis-(4-chlorophenoxy)-acetylamido-propyl-morpholine hydrochloride separated in the form of a very viscous insoluble oil, mixed with excess ethyl bis-(4-chlorophenoxy)-acetate.

It was triturated with water rendered alkaline with sodium carbonate and was then dissolved in chloroform. This solution, after drying over anhydrous sodium sulphate, was saturated with a stream of dry hydrogen chloride and then the solvent was evaporated off under vacuum.

A yellowish-white solid residue of bis-(4-chlorophenoxy)-acetylamido-propyl-morpholine hydrochloride was left. It was purified by recrystallisation from dioxane or ethyl acetate. The yield of the preparation was 52%.

The product has the form of white crystals, soluble in water and chloroform and insoluble in ether. Its melting point is 159° C.

EXAMPLE 16

*Bis-(4-chorophenoxy)-phenylacetamide*

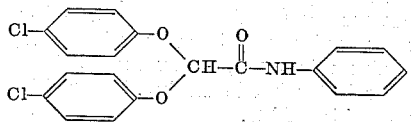

25.6 g. of bis-(4-chlorophenoxy)-acetic acid were dissolved in 22 g. of pure aniline while boiling under reflux for 3 hours.

After cooling, the excess aniline was eliminated from the solution by prolonged washing with 10% hydrochloric acid and then with pure water. The residue was dissolved in hot ethyl alcohol. By adding an excess of water, the solution formed a mass of white needles which were dried and purified using 50% aqueous ethanol solution. The yield was 73%.

The product has the form of white needles, insoluble in water, slightly solube in benzene, soluble in ethanol, ether and chloroform and more soluble in hot ethanol. Its melting point is 121° C.

Bis-(2,4-dichlorophenoxy)-acetic acid amides have also been prepared using the first embodiment of the process. Bis-(2,4-dichlorophenoxy)-acetyl chloride was first prepared by proceeding in the following manner:

The same procedure was used as for bis-(4-chlorophenoxy)-acetyl chloride, by heating to boiling 12 g. of the corresponding acid and 25 ccs. of thionyl chloride for 3 hours.

The residue, on elimination of thionyl chloride, was dissolved in chloroform or ethyl acetate and used forthwith.

EXAMPLE 17

*Bis-(2,4-dichlorophenoxy)-N,N-dimethylacetamide*

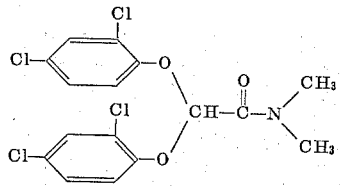

A 100 cc. three-neck flask, provided with a central agitator, an upright condenser and a bromide ampule, was cooled to 0° C. in crushed ice.

The chloroform solution of the bis - (2,4 - dichlorophenoxy)-acetyl chloride obtained from 9.5 g. (0.025 mole) of the corresponding acid was introduced and then, drop by drop and while agitating, a solution of 2.5 g. (0.05 mole+10%) of dimethylamine in chloroform.

Agitation was maintained for about 1 hour after completion of the reaction and then the freezing mixture was removed and, after standing for 2–3 hours at 20° C., the solution was evaporated to dryness under vacuum.

The residue was washed with water and then ether and finally dried. The amide was rescrystallised from absolute alcohol. The yield was 60%.

The product has the form of more or less opaque white crystals, very slightly soluble in the cold in acetone and ethyl alcohol, insoluble in water, ether and petroleum ether and very soluble in chloroform and boiling ethyl alcohol. Its melting point is 153° C.

EXAMPLE 18

*Bis-(2,4-dichlorophenoxy)-acetamide*

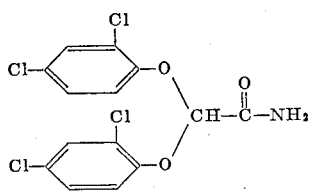

This compound was obtained by the procedure described in Example 17, in a 62% yield, using absolute alcohol as the recrystallisation solvent. It has the form of white needles insoluble in water and cold ethyl alcohol, slightly soluble in ether, chloroform and acetone and very soluble in the hot in alcohol. The melting point of the compound is 145° C.

EXAMPLE 19

*Bis-(2,4-dichlorophenoxy)-N-methylacetamide*

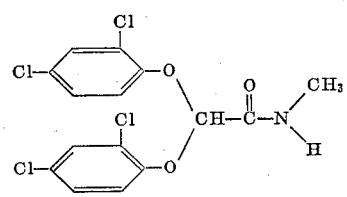

This compound was obtained by the procedure described in Example 17, in a 48% yield, using absolute alcohol as the recrystallisation solvent. It has the form of white crystals insoluble in the cold in water, alcohol and acetone, slightly soluble in ether and chloroform and soluble in boiling ethanol and acetone. The melting point of the compound is 185° C.

EXAMPLE 20

*Bis-(2,4-dichlorophenoxy)-acetyl-N-propylmorpholine*

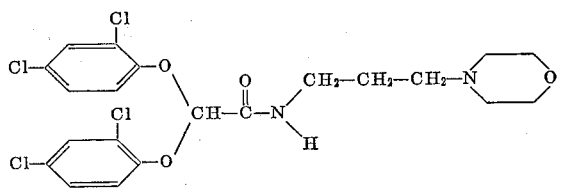

4.3 g. of aminopropylmorpholine in chloroform solution were slowly added to the acid chloride prepared from 11.5 g. of bis-(2,4-dichlorophenoxy)-acetic acid, dissolved in chloroform and cooled to 0° C. After evaporation of the solvent, the residue was taken up in dilute sodium carbonate solution and extracted with ether.

Evaporation of the ether allowed the amide to be isolated and recrystallised from petroleum ether. The yield was 30%.

The product has the form of white crystals and is very soluble in chloroform, acetone, ether and alcohol, insoluble in water and soluble in acid media. Its melting point it 61°–62° C.

EXAMPLE 21

*Bis-(2,4-dichlorophenoxy)-phenylacetamide*

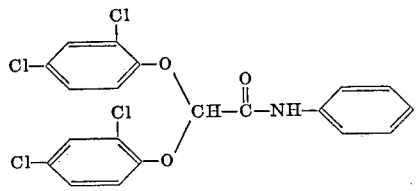

0.5 g. of bis-(2,4-dichlorophenoxy)-acetic acid was heated under reflux for 4 hours with the quantity of aniline strictly necessary to obtain dissolution during the boiling.

After cooling, the reaction mixture gave a white crystalline mass, which was dried, washed carefully with 10% hydrochloric acid and then with pure water and finally recrystallised from absolute ethyl alcohol. The yield was 70%.

The product has the form of white cottony crystals, insoluble in water, very slightly soluble in ether, slightly soluble in the cold in ethyl alcohol, soluble in chloroform and benzene and very soluble in boiling alcohol and benzene. Its melting point is 157° C.

The pharmacodynamic properties of derivatives of the invention have also been studied.

Firstly, their toxicity has been determined by intraperitoneal administration of various products in suspension in gum arabic. The lethal dose 50 has thus been found; these are given in the following table:

| Compound No. of Example | DL50 in g./kg. |
|---|---|
| 2 | 0.65 |
| 3 | 0.18 |
| 4 | 1.4 |
| 5 | 1.65 |
| 6 | 0.6 |
| 7 | 1.05 |
| 8 | 1.55 |
| 9 | 1.20 |
| 10 | 0.80 |
| 11 | >2 |
| 12 | 1.3 |
| 13 | 0.44 |
| 14 | >2 |
| 15 | 0.31 |
| 16 | >2 |
| 17 | 0.62 |
| 18 | 1.4 |
| 19 | >2 |
| 20 | 0.50 |
| 21 | >2 |

It will be seen from this table that the presence of one or two atoms of chlorine in the molecule of compounds of the invention can lead to various modifications depending upon the particular case.

For (di-phenoxy)acetylamido-propyl-morpholine, chlorination diminishes the toxicity, while for diphenoxyacetamide it seems to increase it for the mono-chloro derivative.

For (di-phenoxy)methylacetamide, chlorination does not modify it appreciably and, for (di-phenoxy)dimethylacetamide, it diminishes it for the mono-chloro derivative without modifying it for the di-chloro derivative.

The antispasmodic effect of the derivatives has been studied on isolated rat duodenum. The products were used in suspension (which clearly provides more variable results than a soluble derivative). The effect was compared with that of papaverine as regards the decontractive effects obtained with respect to the spasm caused by the addition of barium chloride to the liquid in which the isolated intestine sample is immersed.

It is known that papaverine is a musculotropic spasmolytic agent. For the most part, the action of the product has usually been compared with that of atropine as regards the spasm caused by acetyl-choline, since atropine is a parasympatholytic antispasmodic agent and thus has a neurotropic action.

These comparisons show whether the derivatives have an antispasmodic action and, if so, whether this is principally musculotropic or neurotropic.

The following table gives a summary of results obtained under these conditions; it gives the ratios of the actions of two spasmolytic controls with that of compounds of the invention, which is naturally much less.

| Compound No. of Example | Action compared with that of papaverine | Action compared with that of atropine |
|---|---|---|
| 2 | 258 | |
| 3 | 9 | 840 |
| 4 | 5 | 1,727 |
| 5 | 24 | 1,333 |
| 6 | 24 | 1,333 |
| 7 | 70 | 9,500 |
| 8 | 10 | 1,000 |
| 9 | 28 | 5,700 |
| 10 | 26 | 2,395 |
| 11 | 550 | 80,000 |
| 12 | >251 | 6,250 |
| 13 | 15 | 2,272 |
| 14 | >207 | >59,259 |
| 15 | 6.3 | 500 |
| 16 | >503 | |
| 17 | 195 | 48,400 |
| 18 | >207 | >15,000 |
| 19 | >286 | >12,000 |
| 20 | 21 | 2,160 |
| 21 | >503 | |

This shows that the compounds of the invention have a preponderant musculotropic antispasmodic action with respect to the neurotropic action. Although this musculotropic action is inferior to that of papaverine, it is nevertheless very marked for (di-phenoxy)acetamide and its mono-chloro derivative, bis-(chloro-4-phenoxy)acetamide and (di-phenoxy)-acetylamino-propyl-morpholine and its mono-chloro derivative, bis-(chloro-4-phenoxy)-acetyl-amido-propyl-morpholine.

Also, the coronary vasodilatory action has been studied on the rabbit heart coronary artery perfused by the Langendorff method.

The effect obtained has been compared with that of papaverine. In the following table, the ratio of the action of papaverine to that of the derivatives tested is given.

| Compound No. of Example | Vasodilatory action compared with that of papaverine |
|---|---|
| 2 | 200 |
| 3 | 25 |
| 4 | 50 |
| 5 | 30 |
| 6 | 38 |
| 7 | 25 |
| 8 | 95 |
| 9 | 73 |
| 10 | 50 |
| 11 | 0 |

The most active products are those corresponding to Examples 3, 5 and 7.

It has been noted that the derivatives studied have a calming effect on the mice, often in sufficient doses to cause them to lose the return reflex. Attempts have therefore been made to seek a barbituric sedation potentialisation action. The tests were carried out on groups of six mice. The comparison was made between the effects caused, on the one hand, by 80 mg./kg. of "Hexobarbital" alone and, on the other hand, by the same does of this barbiturate taken half an hour before administration of various doses of the derivatives studies.

The following table gives the doses of various compounds of the invention which increase the duration of barbituric sedation in variable proportions.

It may be mentioned that, under the conditions in which the tests were carried out, chlorpromazine administered orally in a dose of 5 mg./kg. increases barbituric sedation by 125 to 150% in various groups of control animals tested. With intraperitoneal administration, the percentage of increase of barbituric sedation is:

67% for a dose of 1.25 mg./kg.;
250% for a dose of 2.50 mg./kg.;
256% for a dose of 5 mg./kg.

| Compound No. of Example | 3 | 15 | 20 | 3 | 15 | 20 | 4 | 13 | 18 | 4 | 13 | 18 |
|---|---|---|---|---|---|---|---|---|---|---|---|---|
| Dose in mg./kg. | 50 | 50 | 50 | 100 | 100 | 100 | 50 | 50 | 50 | 100 | 100 | 100 |
| Increase or decrease in sedation, percent | 210 | 342 | 312 | 250 | 485 | 265 | 91 | 150 | 130 | 238 | 121 | 130 |

| Compound No. of Example | 13 | 18 | 5 | 12 | 19 | 5 | 12 | 19 | 7 | 7 | 8 | 8 | 8 |
|---|---|---|---|---|---|---|---|---|---|---|---|---|---|
| Dose in mg./kg. | 200 | 200 | 100 | 100 | 100 | 200 | 200 | 200 | 100 | 200 | 50 | 100 | 200 |
| Increase or decrease in sedation, percent | 245 | 262 | 225 | 173 | 95 | 371 | 275 | 91 | 60 | 250 | 95 | 205 | 280 |

| Compound No. of Example | 6 | 14 | 17 | 6 | 14 | 17 | 6 | 14 | 17 | 11 | 21 | 11 |
|---|---|---|---|---|---|---|---|---|---|---|---|---|
| Dose in mg./kg. | 50 | 50 | 50 | 100 | 100 | 100 | 200 | 200 | 200 | 50 | 50 | 100 |
| Increase or decrease in sedation, percent | 96 | −28 | −31 | 279 | −54 | −11 | 220 | −27 | 27 | −32 | 14 | −44 |

| Compound No. of Example | 11 | 16 | 21 | 11 | 16 | 21 | 10 | 10 | 10 |
|---|---|---|---|---|---|---|---|---|---|
| Dose in mg./kg. | 200 | 200 | 200 | 400 | 400 | 400 | 25 | 50 | 100 |
| Increase or decrease in sedation, percent | −31 | −23 | −21 | 56 | −32 | 20 | 70 | 100 | 150 |

Other pharmacodyamic studies have been carried out with the compounds of the invention.

It has been possible to show that (di-phenoxy)-acetyl-amido-propyl-morpholine injected intraperitoneally has a certain tranquilising action.

To demonstrate this action, the "Rotarod" test was used in which mice are placed on a rotating rod and the percentage of animals is determined which have fallen off after 30 minutes, for instance.

Various doses of the compound and its chlorinated derivatives, i.e. the mono-chloro (Example 15) and di-chloro (Example 20), have been studied.

The following table gives, for various doses of these three compounds, the percentage of animals which had fallen at the end of the time stated. The table also gives the results obtained for (di-phenoxy)methyl-acetamide and its mono- and di-chloro derivatives (Examples 12 and 19).

| Compound No. of Example | Dos in mg./kg. | Percentage of mice fallen |
|---|---|---|
| 3 | 50 | 16 |
|   | 100 | 83 |
| 15 | 100 | 50 |
| 20 | 50 | 16 |
|    | 100 | 93 |
| 5 | 50 | (1) |
|   | 200 | (1) |
| 12 | 100 | 16 |
|    | 200 | 33 |
| 19 | 200 | 16 |

[1] No effect.

In these tests, for the mice tested with the compounds of Examples 3, 15 and 20 in one control group, chlorpromazine in a dose of 2 mg./kg. administered subcutaneously caused 66% of the animals to fall.

Of the mice utilized for the compounds of Examples 5, 12 and 19 in one control group, a dose of 2 mg./kg. of chlorpromazine administered subcutaneously caused 16% of the animals to fall after 30 minutes.

Also, the action of the compounds of the invention on the motility of mice has been studied. For this, observations were taken 15 minutes after oral or intraperitoneal administration of the derivatives studied and any diminution in the motility was noted, for various compounds.

The following table gives the results obtained with various compounds.

| Compound No. of Example | 3 | 15 | 20 | 3 | 15 | 20 | 4 | 13 | 18 | 5 | 12 | 19 |
|---|---|---|---|---|---|---|---|---|---|---|---|---|
| Dose in mg./kg., intraperitoneal | [1] 50 | [1] 50 | [1] 50 | 25 | 25 | 25 | 50 | 50 | 50 | 50 | 50 | 50 |
| Diminution of motility in percent | 56 | 38 | 76 | 74 | 4 | 50 | 65 | 72 | 60 | 35 | 65 | 59 |

[1] Oral

Also, the product of Example 8, namely (diphenoxy) acetylamidoethylmorpholine, has been studied as regards its retardation of gastro-intestinal transit.

In a dose of 62.5 mg./kg. administered intraperitoneally in mice, it retards evacuation of a coloured diet in the intestine by 25%. In a dose of 125 mg./kg., it causes a retardation of 51%. In a dose of 250 mg./kg., it causes a retardation of 68%.

Various pharmaceutical compositions have been prepared with the aid of the compounds of the invention and, particularly, those given below by way of example:

(i)

(Diphenoxy)methylacetamide, 0.10 to 0.20 g., combined with a sufficient quantity of an excipient for a tablet, cachet or capsule;

(ii)

|  | G. |
|---|---|
| Bis(4-chloro-phenoxy)-methylacetamide | 0.25 |
| Lactose | 0.05 | sufficient quantity of an excipient for a tablet, cachet or capsule.

(iii)

|  | G. |
|---|---|
| (Di-phenoxy)acetylamidoethylmorpholine | 0.30 |
| Pancreatic extract | 0.30 | sufficient quantity of an excipient for a tablet or glutinised capsule.

I claim:

1. A compound of the formula:

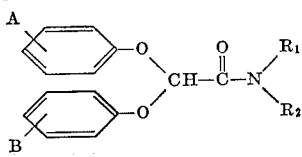

wherein $R_1$ and $R_2$ are the same or different and are each selected from the group consisting of hydrogen, methyl, hydroxyethyl, morpholinoethyl, morpholinopropyl and phenyl, or $R_1$ and $R_2$, together with the N atom, form a heterocycle selected from the group consisting of piperazine chlorophenylpiperazine, and diphenoxyacetylpiperazine, and wherein A and B are each one or two atoms of halogen.

2. A compound according to claim 1, wherein A and B are each mono- or di-chloro.
3. (Diphenoxy)-acetamide.
4. N-methyl-diphenoxy-acetamide.
5. N,N-dimethyl-diphenoxy-acetamide.
6. N-($\beta$-hydroxyethyl)-diphenoxy-acetamide.
7. N,N-bis-($\beta$-hydroxyethyl)-diphenoxy-acetamide.
8. N-phenyl-diphenoxy-acetamide.
9. N-morpholinoethyl-diphenoxy-acetamide.
10. N-morpholinopropyl-diphenoxy-acetamide.
11. 1 - (diphenoxy-acetyl) - 4 - (4' - chloro - phenyl)-piperazine.
12. 1-(diphenoxy-acetyl)-piperazine.
13. N,N-diphenyl-diphenoxy-acetamide monohydrate.
14. Bis-(4-chlorophenoxy)-acetamide.
15. N-methyl-bis-(4-chlorophenoxy)-acetamide.
16. N,N-dimethyl-bis-(4-chlorophenoxy)-acetamide.
17. Bis-(2,4-dichlorophenoxy)-acetamide.
18. N-methyl-bis-(2,4-dichlorophenoxy)-acetamide.
19. N,N-dimethyl-bis-(2,4 - dichlorophenoxy) - acetamide.
20. N-phenyl-bis-(4-chlorophenoxy)-acetamide.
21. N-phenyl-bis-(2,4-dichlorophenoxy)-acetamide.
22. N-morpholinopropyl - bis - (2,4-dichlorophenoxy)-acetamide.
23. N - morpholinopropyl - bis - (4 - chlorophenoxy)-acetamide.

References Cited

UNITED STATES PATENTS 2,520,551  8/1950  Kilgore _____ 260—559 X

ALEX MAZEL, *Primary Examiner.*

NICHOLAS S. RIZZO, JULIAN S. LEVITT, *Examiners.*

JOSE TOVAR, STANLEY J. FRIEDMAN, *Assistant Examiners.*